US011068061B2

(12) United States Patent
La Groce et al.

(10) Patent No.: US 11,068,061 B2
(45) Date of Patent: Jul. 20, 2021

(54) ESTIMATION OF EQUIVALENT INPUT VOLTAGE SUPPLY

(71) Applicant: AITO BV, Amsterdam (NL)

(72) Inventors: Davide La Groce, Helsinki (FI); Turo Keski-Jaskari, Tuusula (FI)

(73) Assignee: AITO BV, Amsterdam (NL)

( * ) Notice: Subject to any disclaimer, the term of this patent is extended or adjusted under 35 U.S.C. 154(b) by 0 days.

(21) Appl. No.: 16/956,054

(22) PCT Filed: Dec. 11, 2018

(86) PCT No.: PCT/EP2018/084260
§ 371 (c)(1),
(2) Date: Jun. 19, 2020

(87) PCT Pub. No.: WO2019/121131
PCT Pub. Date: Jun. 27, 2019

(65) Prior Publication Data
US 2020/0371594 A1 Nov. 26, 2020

(30) Foreign Application Priority Data
Dec. 22, 2017 (FI) .................................. 20176154

(51) Int. Cl.
*G06F 3/01* (2006.01)
*H02H 7/12* (2006.01)
*H02M 3/156* (2006.01)

(52) U.S. Cl.
CPC ........... *G06F 3/016* (2013.01); *H02H 7/1213* (2013.01); *H02M 3/156* (2013.01)

(58) Field of Classification Search
CPC .... H02M 3/156; H02M 3/1563; H02M 3/158; H02H 7/12; H02H 12/03; H02H 7/1213; G06F 3/01; G06F 3/016
See application file for complete search history.

(56) References Cited

U.S. PATENT DOCUMENTS 6,429,641 B1 * 8/2002 Montrose ........... G01R 19/2509
323/277
9,941,787 B2 4/2018 Kawano et al.
(Continued)

FOREIGN PATENT DOCUMENTS

CN 104393756 3/2015
EP 1603219 A1 12/2005
(Continued)

OTHER PUBLICATIONS

International Search Report of PCT/EP2018/084260 dated Mar. 20, 2019 (4 pages).
(Continued)

*Primary Examiner* — Matthew V Nguyen
(74) *Attorney, Agent, or Firm* — Alston & Bird LLP

(57) ABSTRACT

It is an object to provide a device for estimating the equivalent input voltage of a boost converter. According to a first aspect, a device is configured to apply a switching signal to a boost converter, wherein the boost converter is configured to provide a voltage for a haptic feedback element; wait for at least one time interval; measure at least one voltage on an output side of the boost converter; and estimate an equivalent input voltage of the boost converter based on the at least one measured voltage, wherein the equivalent input voltage represents a physical input voltage that would cause the at least one measured voltage in reference conditions. A device, a method, and a computer program are described.

16 Claims, 4 Drawing Sheets

(56) References Cited

U.S. PATENT DOCUMENTS

| | | | |
|---|---|---|---|
| 2005/0047181 A1* | 3/2005 | Yamamoto | H02M 3/07 363/60 |
| 2010/0052770 A1 | 3/2010 | Usami | |
| 2011/0193495 A1 | 8/2011 | Mishima et al. | |
| 2013/0285633 A1* | 10/2013 | Johnson | H02M 3/156 323/282 |
| 2020/0235712 A1* | 7/2020 | May | H03G 3/3005 |
| 2021/0036613 A1* | 2/2021 | Cho | H02M 1/083 |

FOREIGN PATENT DOCUMENTS

| | | | | |
|---|---|---|---|---|
| EP | 3018825 A1 | | 5/2016 | |
| JP | 2005137168 | * | 5/2005 | H02M 7/48 |

OTHER PUBLICATIONS

International Preliminary Report on Patentability for PCT/EP2018/084260 dated Mar. 9, 2020 (16 pages).

Written Opinion of PCT/EP2018/084260 dated Jun. 27, 2019 (8 pages).

Search Report of Finnish Application No. 20176154 dated Jul. 19, 2018 (2 pages).

Wang, B. et al., *Implementation of an estimator-based adaptive sliding mode control strategy for a boost converter based battery/supercapacitor hybrid energy storage system in electric vehicles*, Energy Conversion and Management Oxford, GB: Elsevier Ltd., Sep. 14, 2017, vol. 151, 562-572, ISSN 0196-8904.

Li, C. et al., *Indirect output regulation of DC-DC boost converter with accurate parameter estimation*, In: IECON 2017, $43^{rd}$ Annual Conference, Beijing, China: IEEE, Oct. 29, 2017, 6211-6216, ISBN 978-1-5386-1127-2.

* cited by examiner

ESTIMATION OF EQUIVALENT INPUT VOLTAGE SUPPLY

CROSS-REFERENCE TO RELATED APPLICATIONS

This application is a national phase entry of International Application No. PCT/EP2018/084260, filed Dec. 11, 2018, which claims priority to Finnish Patent Application No. 20176154, filed on Dec. 22, 2017, the entire contents of which are incorporated herein by reference.

TECHNICAL FIELD

The disclosure relates to an electronic device, and more particularly to a device for estimating an equivalent input voltage of a boost converter. Furthermore, the disclosure relates to corresponding methods and a computer program.

BACKGROUND

High voltages are needed in specific applications in electronics. For example, haptic feedback elements that can be used to provide haptic feedback in mobile devices, such as mobile phones, may require tens or even hundreds of volts to operate properly. Meanwhile, a typical battery in a mobile device can directly provide a voltage of only a few volts. This voltage may be converted to a higher one using a boost converter. However, the performance of a boost converter may be affected by various factors and the effect of these factors on the output voltage of the boost converter may be difficult to predict.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device for estimating an equivalent input voltage of a boost converter. The object is achieved by the features of the independent claims. Further implementation forms are provided in the dependent claims, the description and the figures.

According to a first aspect, a device is configured to apply a switching signal to a boost converter, wherein the boost converter is configured to provide a voltage for a haptic feedback element; wait for at least one time interval; measure at least one voltage on an output side of the boost converter; and estimate an equivalent input voltage of the boost converter based on the at least one measured voltage, wherein the equivalent input voltage represents a physical input voltage that would cause the at least one measured voltage in reference conditions. The equivalent input voltage can be used, for example, to characterize the performance of the boost converter and to drive the boost converter better regardless of the conditions.

In a further implementation form of the first aspect, the at least one time interval is in the range of 50-200 microseconds. Thus, the measurement may be substantially unnoticeable to a user.

In a further implementation form of the first aspect, the at least one measured voltage is in the range of 30-500 volts, so that the voltage may be sufficient for a piezoelectric haptic feedback element.

In a further implementation form of the first aspect, the device is further configured to detect undesired behaviour of the boost converter based on the at least one measured voltage. This may allow undesired performance of the boost converter to be detected.

In a further implementation form of the first aspect, the reference conditions comprise a reference temperature, components of the boost converter with predetermined electrical properties, and a predetermined input voltage. Thus, these factors can be characterized by the equivalent input voltage.

In a further implementation form of the first aspect, the device is further configured to disconnect the haptic feedback element from the boost converter for the duration of the at least one time interval and the at least one voltage measurement. This may reduce errors in the measurement caused by the element and prevent the element from producing unwanted haptic feedback or sound during the measurement.

In a further implementation form of the first aspect, the device is further configured to adjust the switching signal based on the equivalent input voltage. Thus, the boost converter can function properly regardless of the conditions.

In a further implementation form of the first aspect, the at least one voltage is measured using a voltage divider on the output side of the boost converter. Thus, the measured voltage can be lower than the output voltage of the boost converter.

In a further implementation form of the first aspect, the input voltage is also measured directly in addition to the estimation of the equivalent input voltage. This allows other operational parameters, such as temperature, to be deduced.

In a further implementation form of the first aspect, the input voltage is also measured using a voltage divider in addition to the estimation of the equivalent input voltage. This allows other operational parameters, such as temperature, to be deduced.

In a further implementation form of the first aspect, the device is further configured to trigger an alarm if undesired behaviour of the boost converter is detected. Thus, the user of the device can be informed if sufficient voltage cannot be provided for the haptic feedback element, the components can be protected from potential damage, and sufficient haptic feedback can be ensured so that a good user experience can be provided.

In a further implementation form of the first aspect, the device is further configured to measure the stiffness of the haptic feedback element by inputting a voltage from the boost converter to the haptic feedback element and measuring a resulting signal from the haptic feedback element after the inputted voltage. This measurement result may be taken into account in the driving of the haptic feedback element.

According to a second aspect, a device is configured to apply a switching signal to a boost converter, wherein the boost converter is configured to provide a voltage for a haptic feedback element; wait until a voltage on an output side of the boost converter reaches a predetermined value; measure a delay between start of the switching signal and the time when the output voltage reaches the predetermined value; and estimate an equivalent input voltage of the boost converter based on the delay, wherein the equivalent input voltage represents a physical input voltage that would cause the measured delay under reference conditions. The equivalent input voltage can be used, for example, to characterize the performance of the boost converter and to drive the boost converter correctly regardless of the conditions.

According to a third aspect, a method comprises applying a switching signal to a boost converter, wherein the boost converter is configured to provide a voltage for a haptic feedback element; waiting for at least one time interval; measuring at least one voltage on an output side of the boost converter; and estimating an equivalent input voltage of the boost converter based on the at least one measured voltage, wherein the equivalent input voltage represents a physical input voltage that would cause the at least one measured voltage in reference conditions.

According to a fourth aspect, a method comprises applying a switching signal to a boost converter, wherein the boost converter is configured to provide a voltage for a haptic feedback element; waiting until a voltage on an output side of the boost converter reaches a predetermined value; measuring a delay between start of the switching signal and the time when the output voltage reaches the predetermined value; and estimating an equivalent input voltage of the boost converter based on the delay, wherein the equivalent input voltage represents a physical input voltage that would cause the measured delay under reference conditions.

According to a fifth aspect, a computer program is provided, comprising program code configured to perform a method according to the third or fourth aspect when the computer program is executed on a computer.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

According to an embodiment, a device applies a switching signal to a boost converter that is operated in some conditions. The boost converter may be configured to provide a voltage to a load, and the load may be, for example, a haptic feedback element. The device waits for a set time interval and then measures a voltage on the output side of the boost converter. Based on the measured voltage and the length of the time interval, the device can deduce the equivalent input voltage, VBST, of the boost converter. The equivalent VBST may be interpreted as the input voltage that would cause the measured voltage under reference conditions. Thus, the equivalent VBST may be a global parameter that includes all variables that affect the performance of the boost converter. Based on the equivalent VBST, the device can adjust the switching signal applied to the boost converter. Thus, the boost converter can provide a sufficient voltage to the load regardless of the conditions and without the need for additional measurement points or sensors. Additionally, the equivalent VBST may be used to deduce other parameters relevant to the performance of the boost converter.

According to an embodiment, the voltage measurement can be repeated multiple times periodically while a switching signal is applied to the boost converter. This may allow the detection of the behaviour of the boost converter that may not be detectable with a single measurement. According to another embodiment, the device may wait until a voltage on the output side of the boost converter reaches a set value and measure the delay between the times when the switching signal was started and when the voltage reached the set value. This measurement can also be used to deduce the equivalent VBST.

Figure 1:
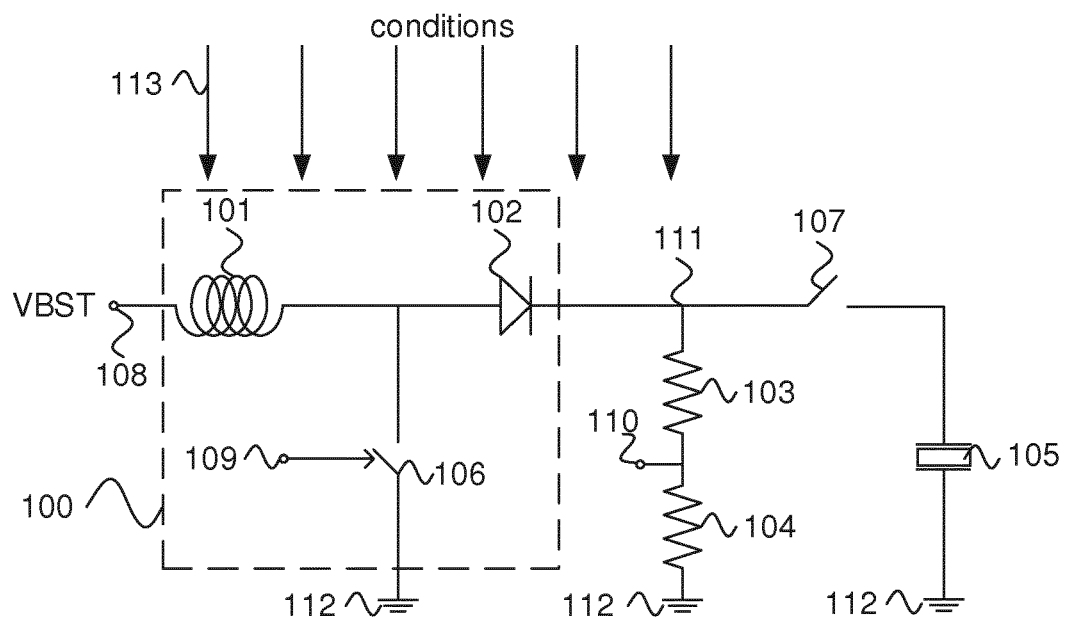
FIG. 1 illustrates a schematic representation of a boost converter circuit according to an embodiment.

FIG. 1 illustrates a schematic representation of a circuit comprising a boost converter 100 according to an embodiment. The circuit comprises an inductor 101, a diode 102, two resistors 103 and 104, and a capacitive load 105. The capacitive load 105 may be, for example, a haptic feedback element configured to provide haptic feedback. The load 105 may also be resistive, inductive, or some combination of these. The circuit further comprises a switch 106 and a disconnecting switch 107. The disconnecting switch 107 may be used to disconnect the capacitive load 105 from the circuit, and the switch 106 may be used to operate the boost converter. In another embodiment, the load 105 may be connected to a bias voltage instead of the ground 112. The boost converter 100 is supplied with an input voltage, VBST, 108, and the switch 106 may be operated by inputting a signal 109. The signal 109 may also be referred to as a switching signal. Switch 106 may be, for example, any type of transistor, and based on the type of the transistor, the switching signal 109 may be a voltage or a current.

The boost converter 100 may to provide a voltage that is higher than the VBST 108 to the capacitive load 105. This may be beneficial in many applications where a relatively low voltage power supply, such as a battery, is available, but a high voltage is needed. When the switch 106 is closed, a current flows through the inductor 101 and the switch 106, and a magnetic field is generated inside the inductor 101. Additionally, the diode 102 prevents any current from flowing from the node 111 to the ground 112 through the switch 106. When the switch 106 is then opened, the magnetic field inside the inductor 101 resists the change of current through the inductor 101 according to Lenz's law, generating a voltage over the inductor 101. Since the VBST 108 and the voltage induced by the inductor 101 are connected in series, a higher voltage is generated between the node 111 and the ground 112. The switch 106 can be opened and can be closed repeatedly by the switching signal 109 in order to increase the voltage in the node 111. The resistors 103 and 104 form a voltage divider between the node 111 and the ground 112. Thus, a fraction of the voltage at node 111 can be measured at node 110. Node 110 may also be referred to as a feedback point. The side on the right side of the diode 102 in FIG. 1 may be referred to as the output side of the boost converter 100.

The output voltage generated by the boost converter 100 is naturally affected by the VBST 108 and by how the switch 106 is operated by the switching signal 109. Additionally, the boost converter 100 is operated in some conditions 113, and these conditions may affect the operation of the boost converter 100. The conditions 113 may comprise, for example, the temperature at which the boost converter 100 is operated, aging of the components of the boost converter 100, unknown electrical properties of the components, limited current on the input side, and load capacitance. The conditions may even comprise the VBST 108 and the switching signal 109. Alternatively or in addition to these, the conditions 113 may comprise any internal or external factor that may affect the operation of the boost converter 100. For example, if the operating temperature of the boost converter 100 is increased, the output voltage at node 111 may change, or if a reference voltage is changed, the behaviour of the boost converter 100 may change. The conditions 113 may comprise a large number of factors, and how these factors affect the operation of the boost converter 100 may be difficult to predict.

It should be appreciated that the boost converter 100 may be implemented in various ways that may differ from the embodiment presented in FIG. 1. For example, capacitors, or any other electrical components, may be added to the boost converter 100 in order to change the performance characteristics of the boost converter 100. Furthermore, FIG. 1 and any other figure herein only presents parts or components that may be used in the embodiments.

Figure 2:
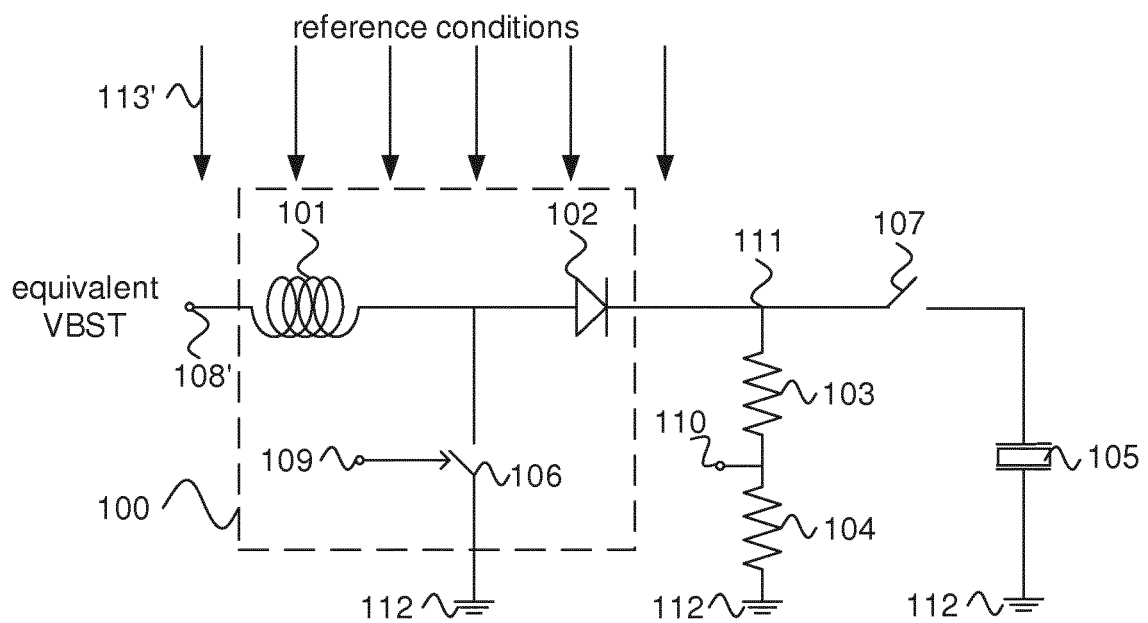
FIG. 2 illustrates a schematic representation of a boost converter circuit in reference conditions according to an embodiment.

FIG. 2 illustrates a schematic representation of a circuit comprising a boost converter 100 according to an embodiment. The boost converter 100 is similar to that presented in FIG. 1. However, now the boost converter 100 is operated in reference conditions 113'. The reference conditions 113' may comprise, for example, an ambient operating temperature and a situation where the components of the boost converter 100 are new and their electrical properties are well known.

If under some non-reference conditions 113 and with an input voltage $V_{BST}$ to the boost converter 100 the voltage at the feedback point 110 is some $V_{FB}$, and under the reference conditions 113' the input voltage $V'_{BST}$ causes the same voltage $V_{FB}$ to the feedback point 110 and the switching signal 109 is the same for both cases, the voltage $V'_{BST}$ may be called an equivalent input voltage or an equivalent VBST. This relation can be expressed mathematically as $V_{FB}=V_{FB}(V_{BST}, s, c)=V_{FB}(V'_{BST}, s, c')$, where c is the conditions 113, c' is the reference conditions 113', and s is the switching signal 109. The equivalent VBST $V'_{BST}$ may be interpreted as the input voltage that would cause the measured voltage at the feedback point under the reference conditions 113'. It should be appreciated that a similar relation can also be expressed using some other voltage on the output side of the boost converter 100. For example, the output voltage could be measured at node 111.

The operating conditions of the boost converter 100, such as temperature, aging of the components, or even the electrical characteristics of the components, may not be known in the normal operation. This can be especially true if the boost converter 100 is manufactured by a third party. Additionally, the physical VBST may not be exactly known. Measurement of the feedback point voltage allows the equivalent VBST to be deduced even if these other factors are unknown. The equivalent VBST can be estimated from the feedback point voltage, for example, based on previous measurements of the boost converter 100 in the reference conditions 113'. Alternatively or in addition to this, the relation between the feedback point voltage and the equivalent VBST can be estimated, for example, from analytical models or circuit or multiphysics simulations. It should be appreciated that the equivalent VBST does not necessarily correspond to any physical voltage in the boost converter 100 at the time of measurement of the feedback point voltage, but it may be considered to be a global parameter that includes all variables that affect the performance of the boost converter 100.

The ability to estimate the equivalent VBST allows the switching signal 109 of the boost converter 100 to be adjusted based on the performance of the boost converter 100. Thus, the boost converter 100 can provide the same output voltage regardless of the conditions in which it is operated, and additional sensors or measurements are not needed to measure the conditions or any additional voltages. This can reduce the amount of components required for robust operation of the boost converter 100. Additionally, the equivalent VBST enables the emulation of the boost converter 100 in different conditions. For example, regardless of the temperature at which the boost converter 100 operates, the behaviour of the boost converter 100 can be emulated at another temperature by applying the corresponding equivalent VBST. Furthermore, if the physical VBST is measured on the input side of the boost converter 100 at the same time as when the equivalent VBST is estimated, other parameters related to the conditions, such as temperature, can be deduced. Additionally, the equivalent VBST can be used to estimate, for example, the overall performance of the booster, the component variance out of range, a third party design out of guidelines, aging, booster malfunction, and an input supply current limit.

Figure 3:
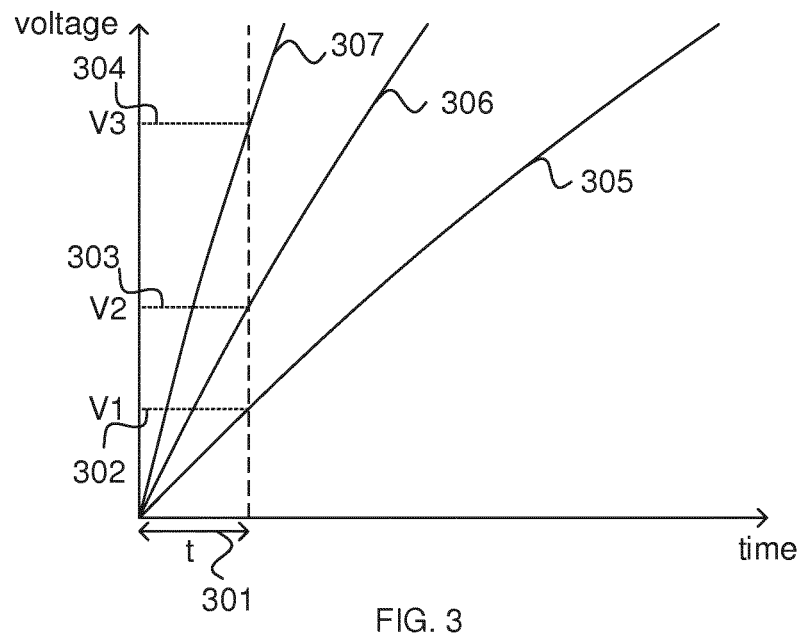
FIG. 3 illustrates a schematic representation of voltage measurement according to an embodiment.

FIG. 3 illustrates a measurement that can be used to estimate the equivalent VBST of a boost converter 100 according to an embodiment. At the start of the measurement, a switching signal 109 is applied to the switch 106. The disconnecting switch 107 may be opened in order to disconnect the capacitive load 105 from the boost converter 100 in order to reduce possible errors in the measurements caused by the capacitive load 105. As the switching signal 109 is applied, a voltage on the output side of the boost converter 100 starts to increase. This voltage may be measured, for example, from the feedback point 110 or from node 111. The switching signal 109 is applied to the switch 106 for a time interval t 301. The length of the time interval t 301 can be, for example, 50-200 microseconds, μs. The time interval may also be in any subrange of this, such as 70-100 μs or 90-150 μs etc.

After the time interval t 301, the voltage on the output side of the boost converter 100 is measured. Alternatively, the switching signal 109 may be applied for a longer period, and the measurement is just made after the time interval t 301. It may be beneficial to limit the time interval t 301 to a small value in order to prevent the voltage from increasing to levels that could cause damage to the circuit. Alternatively or in addition to this, the voltage can be limited to a safe level by, for example, separate monitoring.

In FIG. 3, three different measurement results $V_1$ 302, $V_2$ 303, and $V_3$ 304 are presented, which correspond to the voltages that voltage curves 305, 306, and 307, respectively, can reach during the time interval t 301. The measured voltages can be, for example, in the range of 30-500 volts, V. The measured voltages can also be in any subrange of this, such as 80-150 V or 50-300 V. Based on the measured voltage and the time interval t 301, the equivalent VBST can be deduced.

Figure 4:
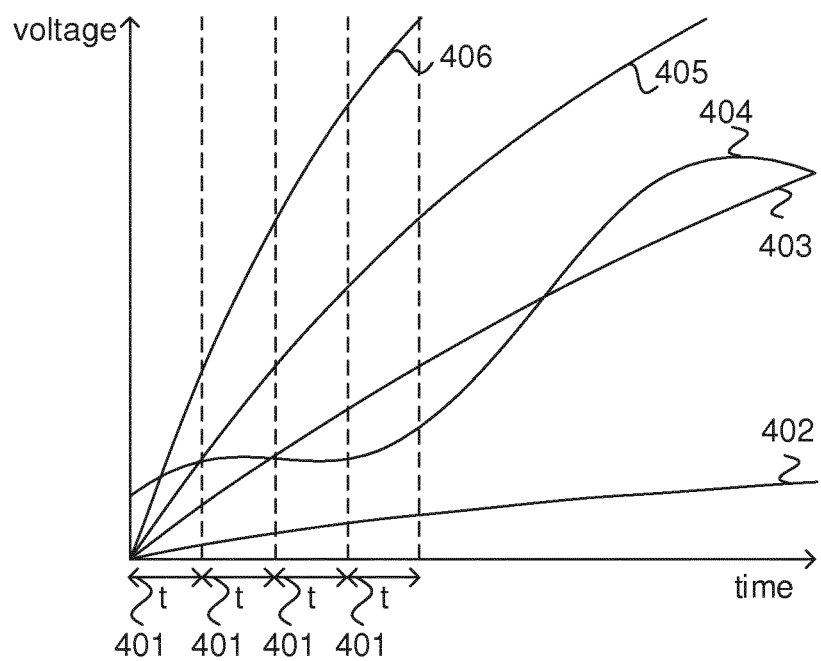
FIG. 4 illustrates a schematic representation of voltage measurement according to another embodiment.

FIG. 4 illustrates a measurement that can be used to estimate the equivalent VBST of a boost converter 100 according to an embodiment. The measurement of FIG. 4 is similar to that presented in FIG. 3. However, now the voltage on the output side of the boost converter 100 is measured multiple times while the switching signal 109 is applied to the switch 106. The voltage can be measured, for example, once between every time interval t 401. Alternatively, according to another embodiment, the time intervals between measurements do not need to be equal for each measurement.

It should be appreciated that voltage curves 402, 403, 405, and 406 can be distinguished from each other even after the first voltage measurement. Thus, for these curves, the measurement of FIG. 3 should be sufficient. However, voltage curve 404 behaves differently. If the method of FIG. 3 was used, for example, for voltage curves 404 and 405, the measurement results could be equal, because the voltages of these curves are approximately equal after the first time interval t 401. However, voltage curve 404 clearly behaves differently from the other voltage curves in FIG. 4; curve 404 comprises some abnormal oscillating behaviour. This type of behaviour may be caused by, for example, a current limit on the input side of the boost converter 100. This behaviour may not be detectable unless the voltage is measured multiple times during the time the switching voltage 109 is applied. Since the behaviour of curve 404 is most likely undesired for a boost converter 100, it may be beneficial to trigger an alarm or an interrupt if such behaviour is detected. Thus, the user can be informed that the user device comprising the boost converter 100 is not functioning properly, and possible damage to electrical components can be prevented.

It should be appreciated that although the measurement of FIG. 3 may not be able to detect the undesired erratic behaviour of voltage curve 404, the measurement of FIG. 3 may be significantly faster than that of FIG. 4. Additionally, the measurement of FIG. 4 may require more computational resources than that of FIG. 3, because of the additional measurements and the processing of these measurements. On the other hand, it may be easier to prevent the measured voltage from reaching levels that could cause damage to the circuit, if the measurement of FIG. 4 is used.

Figure 5:
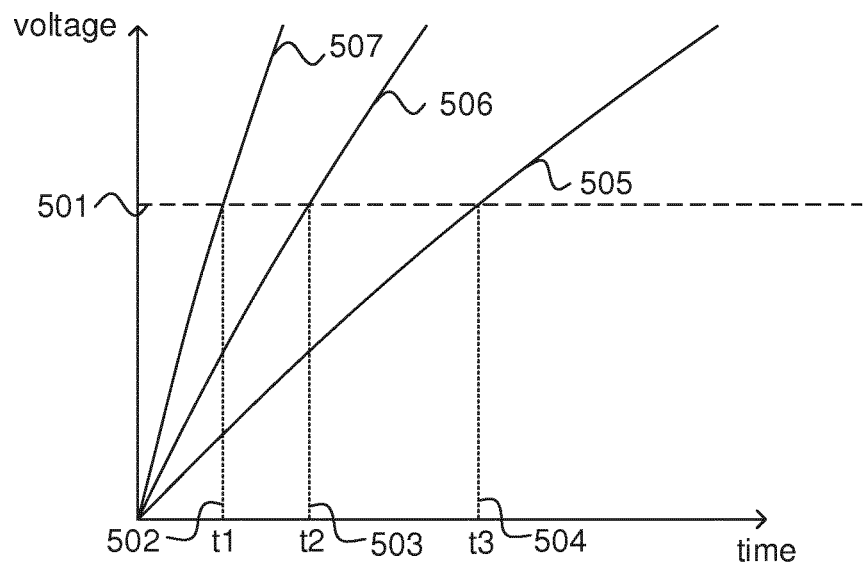
FIG. 5 illustrates a schematic representation of voltage measurement according to another embodiment.

FIG. 5 illustrates a measurement that can be used to estimate the equivalent VBST of a boost converter 100 according to an embodiment. The measurement is similar to that presented in FIG. 3, but instead of waiting for some set time interval after the start of the switching signal 109, the measurement is made by waiting until the voltage on the output side of the boost converter 100 reaches a predetermined value 501. The delay between the start of the switching signal 109 and the voltage reaching the value 501 is then used to determine the equivalent VBST. In FIG. 5 three different voltage curves, 505, 506, and 507 are presented. These curves reach the predetermined voltage value 501 at times $t_1$ 502, $t_2$ 503, and $t_3$ 504, respectively. Based on the voltage 501 and the delays, the corresponding equivalent VBST can be deduced for each curve. It should be appreciated that in this measurement, the voltage may not be able to rise to levels that could harm the circuit, because the measurement is stopped when the voltage reaches the set value 501. However, as can be seen from the curves 505, 506, and 507, the time the voltage takes to reach the set value may vary significantly, which may in turn cause the length of the measurement interval to be unpredictable.

Figure 6:
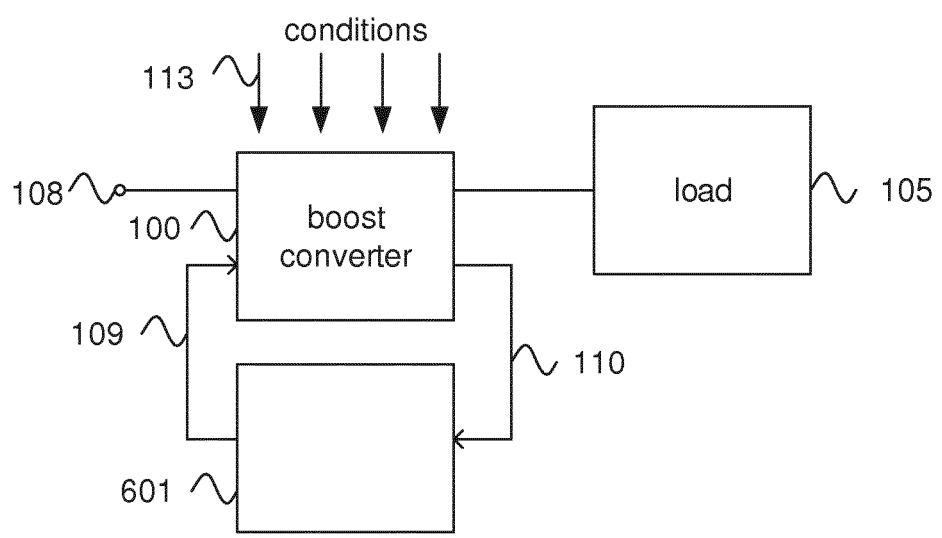
FIG. 6 illustrates a schematic representation of a system comprising a device according to an embodiment.

FIG. 6 illustrates a schematic representation of a system, where the device 601 may adjust the switching signal 109 of a boost converter 100 based on the equivalent VBST. The boost converter 100 is operated in some conditions 113, and it is configured to provide a voltage to the load 105 using the lower voltage VBST 108. The device 601 is configured to measure a voltage from the feedback point 110. Alternatively, the device 601 may measure some other voltage on the output side of the boost converter 100. For the measurement, the device 601 may use, for example, the procedures presented in FIGS. 3-5, and based on the measured voltage, the device 601 can estimate the equivalent VBST. In turn, based on the equivalent VBST, the device 601 may adjust the switching signal 109 in such a way that sufficient voltage is provided for the load 105 regardless of the conditions 113.

It should also be appreciated that the VBST 108 does not need to be regulated as accurately as if the device 601 was not used, which may reduce the amount of components needed. For example, a separate regulator may not be needed. This may be especially beneficial with mobile devices. Furthermore, in all applications, accurately regulated input voltage may not even be available. Additionally, the system is more robust and can be used in more varying conditions and applications than if the device 601 was not used.

Figure 7:
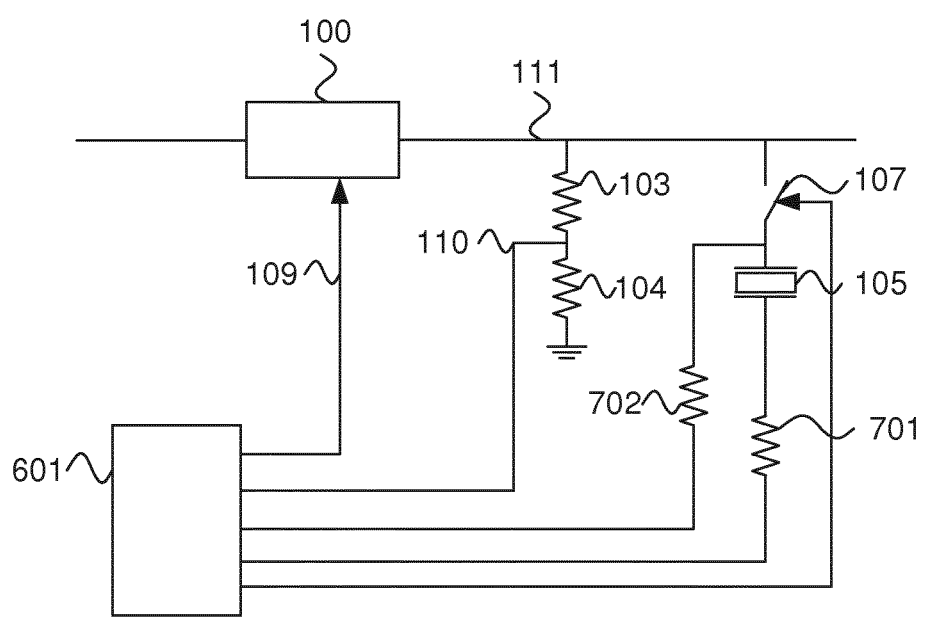
FIG. 7 illustrates a schematic representation of a system comprising a device according to an embodiment.

FIG. 7 illustrates a schematic representation of a system, where the device 601 may adjust the switching signal 109 of a boost converter 100 based on the equivalent VBST. The device 601 drives the boost converter 100 using the switching signal 109, and the boost converter 100 provides a voltage to the load 105. Additionally, the device 601 may be connected to the boost converter 100 through other electrical connections which can be used, for example, to switch the boost converter 100 on. The device 601 may be implemented using, for example, a microcontroller or any other programmable device such as a field programmable gate array, FPGA. The device 601 may measure a voltage on the output side of the boost converter 100 using, for example, the procedures presented in FIGS. 3-5 and estimate the equivalent VBST. The capacitive load 105, which may be for example a haptic feedback element, is also connected to the device 601 through the resistors 701 and 702. The device 601 may use the connections through the resistors 701 and 702 to apply different voltages over the load 105. For example, if the same bias voltage is applied through both resistors 701, 702, the load 105 can be set to idle mode. Furthermore, the device 601 may use the disconnecting switch 107 to disconnect the load 105 from the boost converter 100. It should be appreciated that multiple loads 105 may be connected to the output of the boost converter 100 so that the boost converter 100 can provide a voltage for multiple loads 105.

In addition to estimating the equivalent VBST and driving the boost converter 100, the device 601 may also use other measurements and control procedures related to the functionality of the circuit. For example, if the load 105 is a haptic feedback element, the device 601 may measure the stiffness of the haptic feedback element. The stiffness of the element may affect the voltage that should be provided to the element by the boost converter 100. The stiffness can be measured, for example, by driving a known voltage to the element by the boost converter 100 for a set cycle and measuring the signal produced by the element after the cycle.

It should be appreciated that the device 601 can also be implemented as a part of some other device or circuit. Additionally, the device 601 may measure other voltages from the circuit. For example, the device 601 may also measure the input voltage of the boost converter and use this with the estimated equivalent VBST to deduce other parameters related to the operation of the boost converter 100.

Alternatively or in addition to this, the device 601 can measure the input voltage using a voltage divider. Furthermore, the device 601 may communicate with other devices or circuits, for example, to trigger and alarm or an interrupt if undesired behaviour of the boost converter 100 is detected. This may be especially beneficial in situation where the device 601 cannot drive the boost converter in such a way that sufficient voltage is provided to the load 105.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

The functionality described herein can be performed, at least in part, by one or more computer program product components such as software components. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the objective and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, configured to:
   apply a switching signal to a boost converter, wherein the boost converter is configured to provide a voltage for a haptic feedback element;
   wait for at least one time interval;
   measure at least one voltage on an output side of the boost converter;
   estimate an equivalent input voltage of the boost converter based on the at least one measured voltage, wherein the equivalent input voltage represents a physical input voltage that would cause the at least one measured voltage in reference conditions;
   measure the input voltage directly in addition to the estimation of the equivalent input voltage; and
   deduce parameters related to the operation of the boost converter based on the equivalent input voltage and the measured input voltage.

2. The device of claim 1, wherein the at least one time interval is in the range of 50-200 microseconds.

3. The device of claim 1, wherein the at least one measured voltage is in the range of 30-500 volts.

4. The device of claim 1, further configured to:
   detect undesired behaviour of the boost converter based on the at least one measured voltage.

5. The device of claim 1, wherein the reference conditions comprise a reference temperature, components of the boost converter with predetermined electrical properties, and a predetermined input voltage.

6. The device of claim 1, further configured to:
   disconnect the haptic feedback element from the boost converter for the duration of the at least one time interval and the at least one voltage measurement.

7. The device of claim 1, further configured to:
   adjust the switching signal applied to the boost converter based on the equivalent input voltage.

8. The device of claim 1, further comprising a voltage divider on the output side of the boost converter, wherein the device is further configured to measure the at least one voltage using the voltage divider on the output side of the boost converter.

9. The device of claim 1, further comprising a voltage divider on the input side of the boost converter, wherein the device is further configured to also measure the input voltage using the voltage divider in addition to the estimation of the equivalent input voltage.

10. The device of claim 1, further configured to:
    trigger an alarm if undesired behaviour of the boost converter is detected.

11. The device of claim 1, further configured to:
    measure a stiffness of the haptic feedback element by inputting a voltage from the boost converter to the haptic feedback element and measuring a resulting signal from the haptic feedback element after the inputted voltage.

12. A method, comprising:
    applying a switching signal to a boost converter, wherein the boost converter is configured to provide a voltage for a haptic feedback element;
    waiting for at least one time interval;
    measuring at least one voltage on an output side of the boost converter;
    estimating an equivalent input voltage of the boost converter based on the at least one measured voltage, wherein the equivalent input voltage represents a physical input voltage that would cause the at least one measured voltage in reference conditions;

measuring the input voltage directly in addition to the estimation of the equivalent input voltage; and deducing parameters related to the operation of the boost converter based on the equivalent input voltage and the measured input voltage.

13. A computer program comprising program code configured to perform a method according to claim 12 when the computer program is executed on a computer.

14. A method, comprising:

applying a switching signal to a boost converter, wherein the boost converter is configured to provide a voltage for a haptic feedback element;

waiting until a voltage on an output side of the boost converter reaches a predetermined value;

measuring a delay between start of the switching signal and the time when the output voltage reaches the predetermined value;

estimating an equivalent input voltage of the boost converter based on the delay, wherein the equivalent input voltage represents a physical input voltage that would cause the measured delay under reference conditions;

measuring the input voltage directly in addition to the estimation of the equivalent input voltage; and deducing parameters related to the operation of the boost converter based on the equivalent input voltage and the measured input voltage.

15. A device, configured to perform the steps of claim 14.

16. A computer program comprising program code configured to perform a method according to claim 14 when the computer program is executed on a computer.

\* \* \* \* \*